United States Patent
Ma (10) Patent No.: US 11,857,112 B2
(45) Date of Patent: Jan. 2, 2024

(54) HEAT EXCHANGING LIQUID CONTAINER

(71) Applicant: THE CURATORS OF THE UNIVERSITY OF MISSOURI, Columbia, MO (US)

(72) Inventor: Hongbin Ma, Columbia, MO (US)

(73) Assignee: THE CURATORS OF THE UNIVERSITY OF MISSOURI, Columbia, MO (US)

(*) Notice: Subject to any disclaimer, the term of this patent is extended or adjusted under 35 U.S.C. 154(b) by 515 days.

(21) Appl. No.: 17/257,061

(22) PCT Filed: Jul. 31, 2019

(86) PCT No.: PCT/US2019/044289
§ 371 (c)(1),
(2) Date: Dec. 30, 2020

(87) PCT Pub. No.: WO2020/028465
PCT Pub. Date: Feb. 6, 2020

(65) Prior Publication Data
US 2021/0137313 A1    May 13, 2021

Related U.S. Application Data (60) Provisional application No. 62/713,599, filed on Aug. 2, 2018.

(51) Int. Cl.
*A47J 41/00* (2006.01)
*A47G 19/22* (2006.01)
*C09K 5/06* (2006.01)

(52) U.S. Cl.
CPC ...... *A47J 41/0044* (2013.01); *A47G 19/2288* (2013.01); *A47J 41/0011* (2013.01); *C09K 5/066* (2013.01)

(58) Field of Classification Search
CPC .......... A47J 41/0044; A47J 41/0011; A47J 36/2494; A47G 19/2288; C09K 5/066
See application file for complete search history.

(56) References Cited

U.S. PATENT DOCUMENTS 2,876,634 A   3/1959  Zimmerman et al.
3,205,677 A   9/1965  Stoner
(Continued)

OTHER PUBLICATIONS

International Search Report for corresponding Application No. PCT/US2019/044289 dated Oct. 16, 2019.
(Continued)

*Primary Examiner* — Vishal Pancholi
(74) *Attorney, Agent, or Firm* — Sandberg Phoenix & von Gontard PC (57) ABSTRACT

A heat exchanging liquid container system comprising a main body; a phase change material (PCM) module disposable within the main body; a PCM disposed within the PCM module; a liquid reservoir defined by the main body and/or the PCM module configured to have liquid disposed therein having a first temperature; and a temperature conditioning channel formed along a wall of the PCM module and/or through the PCM module such that the temperature conditioning channel is in thermal contact with the PCM. The temperature conditioning channel configured to provide a flow path through which the liquid can flow to dispense the liquid from the liquid reservoir such that the liquid will be in thermal contact with the PCM while being dispensed. The PCM configured to exchange thermal energy with the liquid and thereby condition the liquid to be dispensed at a second temperature that is within a desired temperature range.

14 Claims, 7 Drawing Sheets

(56) References Cited

U.S. PATENT DOCUMENTS

| | | | |
|---|---|---|---|
| 3,603,106 | A | 9/1971 | Ryan |
| 3,807,194 | A | 4/1974 | Bond |
| 3,995,445 | A | 12/1976 | Huskins |
| 4,638,645 | A | 1/1987 | Simila |
| 6,634,417 | B1 | 10/2003 | Kolowich |
| 7,934,537 | B2 | 5/2011 | Kolowich |
| 2008/0087270 | A1 | 4/2008 | Shaikh et al. |
| 2011/0017439 | A1 | 1/2011 | Carloff et al. |
| 2017/0350645 | A1 | 12/2017 | Dussault |
| 2018/0171197 | A1 | 6/2018 | Ma et al. |

OTHER PUBLICATIONS

Written Opinion for corresponding Application No. PCT/US2019/044289 dated Oct. 16, 2019.
U.S. Pat. No. 83,755; Issued: Nov. 3, 1868; Bass; unable to enter this patent above due to formatting issues with USPTO IDS Form.

HEAT EXCHANGING LIQUID CONTAINER

CROSS-REFERENCE TO RELATED APPLICATIONS

This application is the US national stage under 35 U.S.C. § 371 of International Application No. PCT/US2019/044289, which was filed on Jul. 31, 2019, which claims the benefit of U.S. Provisional Application No. 62/713,599, filed on Aug. 2, 2018, the disclosures of which are incorporated herein by reference in its/their entirety.

FIELD

The present teachings relate to thermally insulating containers, and more particularly to a heat exchanging thermal liquid container.

BACKGROUND

The statements in this section merely provide background information related to the present disclosure and cannot constitute prior art.

There are many thermal insulating beverage containers on the market today. Such containers are typically structured and operable to minimize (i.e., slow down) the rejection and/or absorption of heat from the liquid beverage disposed within the container into or from the ambient environment. That is, such containers are structured and operable to slow down the cooling and/or warming of the liquid beverage by providing an insulating barrier between the hot or cold liquid and the ambient environment such that the rejection of the thermal energy within liquid to the ambient environment, and/or the absorption of the thermal energy within liquid by the ambient environment is minimized. Such thermal insulating beverage containers are relatively thermally inefficient and do not maintain the liquid beverage at a desirable drinking temperature for an extended period of time. For hot beverages an example of the desired drinking temperature can be approximately 98° F. to 160° F. (approximately 37° C. to 71° C.). For cold beverages an example of the desired drinking temperature can be approximately 32° F. to 50° F. (approximately 0° C. to 10° C.). Such known thermal insulating beverage containers are generally known to maintain the respective liquid beverage within the desired drinking temperature range only for approximately 15 to 30 minutes.

Such known thermal insulating beverage containers are generally known to maintain the respective liquid beverage within the desired drinking temperature range only for a short period of time. For example, if a hot beverage is poured into a paper cup without any insulation, the temperature of the beverage may remain within the desired drinking temperature range for only approximately 5-30 minutes. Or, for example, if a hot liquid is poured into a known insulated beverage container, e.g., a double-walled vacuum tumbler, the beverage may remain the desired drinking temperature range for only approximately 30-90 minutes.

Various related technology patents are U.S. Pat. Nos. 2,876,634; 3,205,677; 3,603,106; 3,807,194; 3,995,445; 4,638,645; 6,634,417; 7,934,537; and 0,083,755. However, the manufacturing process disclosed in such patents has limited application.

SUMMARY

In various embodiments, the present disclosure provides a heat exchanging liquid container system for consistently dispensing a liquid from the system at a temperature within a desired temperature range, the system comprises a main body, a phase change material (PCM) module disposable within the main body, a PCM disposed within the PCM module, the PCM having a selected melting temperature, and a liquid reservoir defined by the main body and/or the PCM module, the liquid reservoir structured and operable to have liquid disposed therein having a first temperature. The system additionally comprises a temperature conditioning channel formed along a wall of the PCM module and/or through the PCM module such that the temperature conditioning channel is in thermal contact with the PCM within the PCM module. The temperature conditioning channel is structured and operable to provide a flow path through which the liquid can flow to dispense the liquid from the liquid reservoir such that the liquid will be in thermal contact with the PCM while being dispensed. The PCM is structured and operable to, via the thermal contact with the liquid as the liquid is dispensed though the temperature conditioning channel, exchange thermal energy with the liquid and thereby condition the liquid to be dispensed at a second temperature that is within a desired temperature range determined by the selected PCM melting temperature.

In various embodiments, the present disclosure provides a heat exchanging liquid container system for consistently dispensing a liquid from the system at a temperature within a desired temperature range, wherein the system comprises a main body, a phase change material (PCM) module disposable within the main body, a PCM disposed within the PCM module, the PCM having a selected melting temperature, a liquid reservoir defined by at least one of the main body and the PCM module, the liquid reservoir structured and operable to have liquid disposed therein having a first temperature, and a flow director disposed within the liquid reservoir, the flow director having a diameter that is smaller than a diameter of a sidewall PCM module. The system additionally comprises a temperature conditioning channel formed between flow director and the sidewall of the PCM module such that the temperature conditioning channel is in thermal contact with the PCM within the PCM module, wherein the temperature conditioning channel is structured and operable to provide a flow path through which the liquid will flow when being dispensed from the liquid reservoir such that the liquid will be in thermal contact with the PCM while being dispensed, the PCM structured and operable to, via the thermal contact with the liquid as the liquid is dispensed though the temperature conditioning channel, exchange thermal energy with the liquid and thereby condition the liquid to be dispensed at a second temperature that is within a desired temperature range determined by the selected PCM melting temperature.

In various embodiments, the present disclosure provides a heat exchanging liquid container system for consistently dispensing a liquid from the system at a temperature within a desired temperature range, wherein the system comprises a main body, a lid assembly removably engageable with the main body, the lid comprising a center cover integrally formed with a circumferential rim, a phase change material (PCM) module connectable to an underside of the center cover of the lid such that the PCM module is suspended into the main body when the lid is engaged with the main body, and a PCM disposed within the PCM module, the PCM having a selected melting temperature. The system additionally comprises a liquid reservoir defined around and below the PCM module, between the PCM module and the main body, when the lid is engaged with the main body and the PCM module is suspended into the main body, the liquid reservoir structured and operable to have liquid disposed therein having a first temperature. The system further comprises a tubular liquid conduit extending through the PCM module and the lid center cover, wherein the liquid conduit defines a temperature conditioning channel formed through the PCM module such that the temperature conditioning channel is in thermal contact with the PCM within the PCM module, wherein the temperature conditioning channel is structured and operable to provide a flow path through which the liquid can flow to dispense the liquid from the liquid reservoir such that the liquid will be in thermal contact with the PCM while being dispensed, the PCM structured and operable to, via the thermal contact with the liquid as the liquid is dispensed though the temperature conditioning channel, exchange thermal energy with the liquid and thereby condition the liquid to be dispensed at a second temperature that is within a desired temperature range determined by the selected PCM melting temperature. The system still further comprises a liquid flow controller structured and operable to control the flow of liquid through the temperature conditioning channel, and a liquid reservoir direct flow outlet structured and operable provide a flow path for dispensing liquid disposed within liquid reservoir without the liquid flowing through the temperature conditioning channel such that the liquid can be dispensed at the first temperature.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and can include simplified conceptual views to facilitate understanding or explanation. As well, the relative size and arrangement of the components can differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" can be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there can be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms can be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components can be oriented differently, for instance, during transportation and manufacturing as well as operation. Because many varying and different embodiments can be made within the scope of the concept(s) herein taught, and because many modifications can be made in the embodiments described herein, it is to be understood that the details herein are to be interpreted as illustrative and non-limiting.

As used herein, it will be understood that generally a phase change material (PCM) is a substance with a high heat of fusion that melts and solidifies at a certain temperature and is capable of storing and releasing large amounts of energy. Heat is absorbed or released when the PCM changes from solid to liquid and vice versa, thus, PCMs are often classified as latent heat storage (LHS) units. When PCMs reach the temperature at which they change phase (their melting temperature) they absorb large amounts of heat at an almost constant temperature. The PCM continues to absorb heat without a significant rise in temperature until all the material is transformed to the liquid phase. When the temperature of the environment surrounding the liquid PCM falls to below the PCM melting temperature, the PCM solidifies, releasing its stored latent heat into the surrounding environment. A large number of PCMs are available in any required temperature range, e.g., from approximately 20° F. to 375° F. (approximately from −7° C. up to 19° C.). Many PCMs can store 5 to 14 times more heat per unit volume than sensible heat of conventional storage materials such as water, masonry or rock.

Referring now to FIGS. 1 through 6C, generally the present disclosure provides a heat exchanging liquid container system 10 (e.g., a consumable beverage container or mug) that quickly conditions (e.g., changes the temperature of) a liquid (e.g., a consumable beverage) disposed therein to a temperature within a desired temperature range (e.g., a desired drinking temperature range) as the liquid is discharged from, or poured out of, the system 10 (e.g., as a consumable beverage is being consumed). It should be understood that although the container system 10 of the present disclosure can be used to condition and provide any liquid within a desired temperature range upon removal or dispensing of the liquid from the liquid/beverage reservoir 42, and remain within the scope of the present disclosure, for simplicity and clarity the container system 10 will be illustrated and described herein as a beverage container system 10 used to condition and provide a consumable beverage within a desired drinking temperature range upon removal or dispensing of the beverage from the beverage reservoir 42. In such embodiments, example desired drinking temperature ranges can be approximately 98° F. to 160° F. or 37° C. to 71° C. for hot beverages, and approximately 32° F. to 55° F. or 0° C. to 13° C. for cold beverages.

Generally, the container system 10 comprises a main body 14 and a phase change material (PCM) module 18 disposed or disposable within the main body 14 and a beverage reservoir 42 defined within main body 14 and/or the PCM module 18. In various instances, the PCM module 18 can be fixedly connected to the main body 14, or in various alternative instances, the PCM module 18 can be a removable module removably disposed within the main body 14. The main body 14 comprises at least one sidewall 22 and a bottom 26 that enclose the PCM module 18 and the beverage reservoir 42. The liquid/beverage reservoir 42 is suitable for retaining various hot and/or cold liquids and beverages (e.g., coffee, tea, hot chocolate, soda, beer, water, etc.) having a first temperature. The main body 14 can be structured and formed to have generally any radial (or lateral) cross-sectional shape. For example, in various embodiments, the main body 14 can be structured and formed to have a cylindrical, square, oval, rectangular, triangular, etc., radial (or lateral) cross-sectional shape.

The system 10 additionally includes at least one temperature conditioning channel 62 formed along a wall of and/or through the PCM module 18 and through which the beverage will flow when being dispensed.

The PCM module 18 is a hollow body having a PCM cavity 46 that is structured to retain a desired PCM 50 that thermally contacts a beverage within the temperature conditioning channel(s) 62 such that thermal energy is exchanged between the beverage and the PCM 50 to dispense the beverage to a consumer at a temperature within a desired temperature range, as described below. It is envisioned that the PCM module 18 can be any one or more reservoir, bladder, compartment, cavity, container, housing, or other hollow structure that can be at least partially filled with the PCM 50. Moreover, the PCM module 18 is structured and formed to be airtight and leak-tight such that any beverage (or other liquid) that may be disposed within beverage reservoir 42 and/or conditioning channel(s) 62 will not leak, migrate or otherwise enter the PCM cavity 46, and similarly such that the PCM 50 will not leak, migrate or otherwise enter the beverage reservoir 42 and/or conditioning channel(s) 62. The PCM module 18 can be fabricated of any material suitable for retaining hot and/or cold beverages (or liquids), e.g., beverages (or liquids) ranging from approximately 20° F. to 200° F., approximately −7° C. to 94° C. For example, it is envisioned that the PCM module 18 can be fabricated from stainless steel, glass, ceramics, suitable plastics, etc. The heat exchanging liquid container system 10 is structured and operable to condition a liquid (e.g., a consumable beverage) to within the desired temperature range (e.g., the desired drinking temperature range) for an extended period of time (e.g., 3 to 24 hours).

The heat exchanging thermal liquid container system 10 additionally includes a lid or cap assembly 66 that is removable engageable with the main body 14 and/or the PCM module 18 to cover the top opening of the beverage reservoir 42. The lid assembly 66 is structured and operable to prevent and/or inhibit the beverage disposed within the beverage reservoir 42 from readily flowing or splashing out of the beverage reservoir 42, and to allow controlled dispensing of the beverage from the beverage reservoir 42.

Generally, the heat exchanging liquid container system 10 of the present disclosure is structured and operable such that when a person discharges or pours a beverage from the container system 10 (e.g., proceeds to consume the beverage), the beverage flows through the one or more temperature conditioning channels 62, whereby heat is exchanged between the beverage and a phase change material, thereby instantly reducing or increases the beverage temperature to a temperature within the desired drinking temperature. For example, in various embodiments, the heat exchanging liquid container system 10 that is structured and operable to allow a person who desires to drink a hot liquid (e.g., a hot consumable beverage) that has a temperature higher than an upper limit of a desired drinking temperature (e.g., greater than 160° F./71° C.) to pour a hot beverage into the beverage reservoir 42 of the system 10, whereafter the liquid can be consumed substantially instantly at a temperature within the desired drinking temperature range (e.g. 98° F. to 160° F. or 37° C. to 71° C.). More particularly, substantially immediately, or within a very short time (e.g., 1-30 seconds) after the hot beverage is poured into the beverage reservoir 42, the beverage can be discharged or poured from the reservoir 42, whereby as the hot beverage flows through one or more temperature conditioning channel 62 heat is extracted from beverage by a phase change material (as described below) substantially instantly reducing the beverage temperature to a temperature within the desired drinking temperature range.

More specifically, when a beverage (e.g., a hot beverage such as coffee, is poured into or disposed within the beverage reservoir 42), and when the beverage is dispensed through the conditioning channel(s) 62, the thermal energy (i.e., the heat) from hot beverage is transferred (i.e., rejected to and absorbed by) the PCM 50, causing the PCM 50 to change phase from a substantially solid form to a liquid form, whereby the PCM 50 stores the thermal energy (i.e., the heat). Note the PCM 50 is selected to have melting temperature that is within a desired drinking temperature range for the respective beverage. Therefore, when the hot beverage is poured into the beverage reservoir 42, and when the beverage is dispensed through the conditioning channel(s) 62, the PCM absorbs thermal energy (e.g., heat) from the hot beverage, such that the temperature of the hot beverage is reduced to the respective melting temperature of the respective PCM 50 (i.e., within the desired drinking temperature range). Thereafter, when the temperature of the beverage cools such that the temperature of the beverage in the beverage reservoir 42 is reduced to a temperature below the melting temperature of PCM 50, the PCM 50 releases (i.e., rejects) the thermal energy (i.e., the heat) stored in the PCM 50 back into beverage to maintain the beverage at or near the melting temperature of the PCM 50, and therefore within the desired drinking temperature range. That is, the heat stored in the PCM 50 is rejected to and absorbed by the beverage within the beverage reservoir 42, and when the beverage is dispensed through the conditioning channel(s) 62, thereby heating the beverage or maintaining the beverage within a particular desired drinking temperature range, or at an approximately steady or constant temperature, during which time the PCM 50 gradually changes from the liquid form back to the solid form. In this way, a hot beverage disposed within the beverage reservoir 42 can be quickly cooled down and dispensed having a temperature within the desired drinking temperature range (e.g., a temperature within the range of approximately 98° F. to 160° F., 37° C. to 71° C.), for many hours (e.g., approximately 1 to 15 hours).

Similarly, in various other embodiments, the heat exchanging liquid container system 10 is further structured and operable to allow a person who desires to drink a cold or cool liquid (e.g., a cold or cool consumable beverage) that has temperature that is higher than an upper limit of a desired temperature (e.g., greater than 55° F./13° C.) to pour a beverage into the reservoir 42, whereafter the liquid can be consumed substantially instantly at a temperature within the desired drinking temperature range (e.g., 32° F. to 55° F., 0° C. to 13° C.). More particularly, substantially immediately, or within a very short time (e.g., 1-30 seconds) after the beverage is poured into the beverage reservoir 42, the beverage can be discharged or poured from the reservoir 42, whereby as the beverage flows through the temperature conditioning channel(s) 62 heat is extracted from beverage by the phase change material (as described below) substantially instantly reducing the beverage temperature to a temperature within the desired drinking temperature.

Additionally, the temperature conditioning channel 62 has a width W that is selected to regulate the volume and flow rate of beverage allowed to be dispensed, and additionally regulate the rate of thermal energy exchange between the beverage and the PCM 50. As one skilled in the art will readily understand, the smaller the volume of beverage in thermal contact with the PCM 50 (i.e., the small the width W of the conditioning channel 62) the higher the rate of thermal energy exchange between the beverage and the PCM 50, and more specifically, the faster the temperature of beverage will be conditioned, or adjusted, to approximate the melting temperature of the PCM 50.

Figure 1:
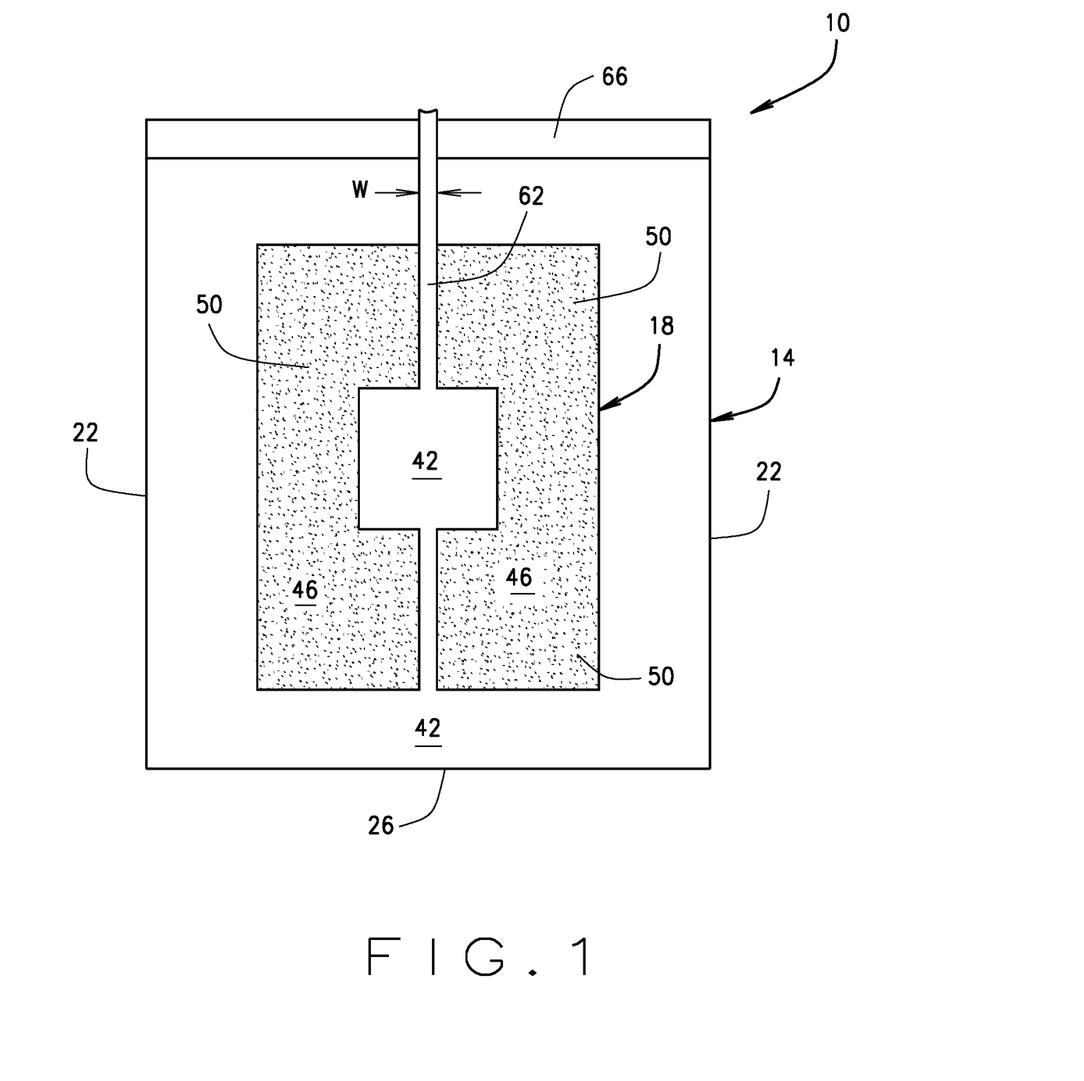
FIG. 1 is a block diagram of an exemplary heat exchanging liquid container system, in accordance with various embodiments of the present disclosure.
Figure 2A:
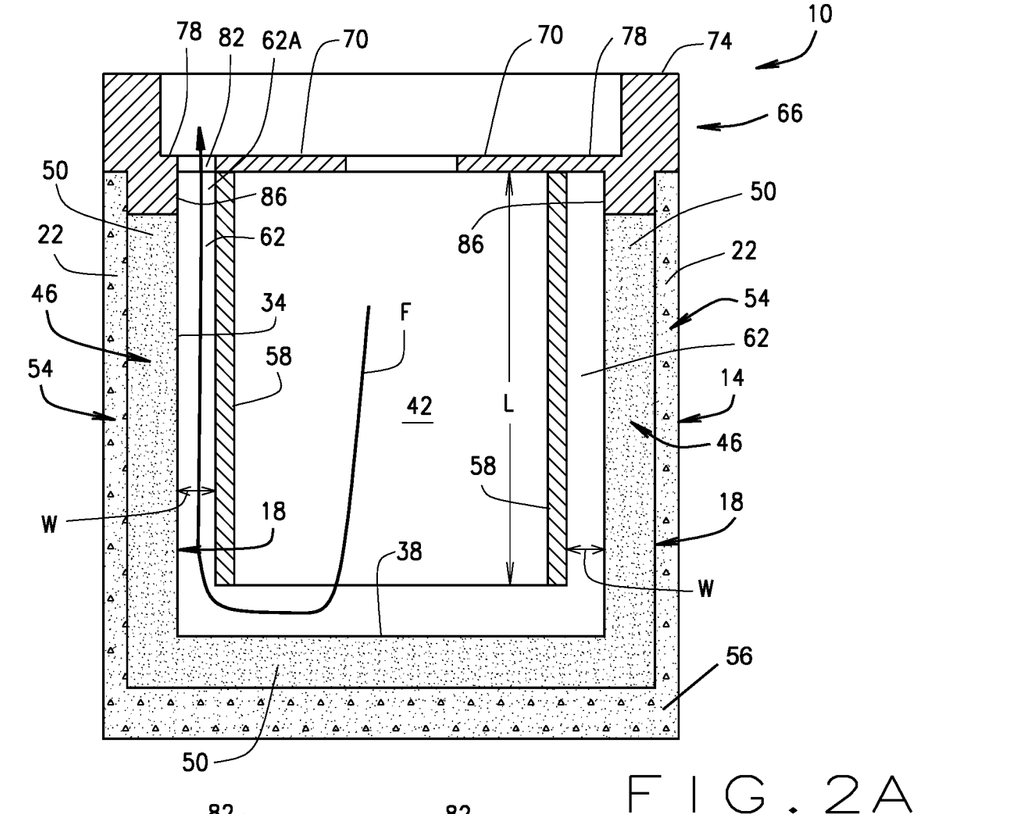
FIG. 2A is a cross-sectional view of exemplary heat exchanging liquid container system shown in FIG. 1 having a flow director, in accordance with various embodiments of the present disclosure.
Figure 2B:
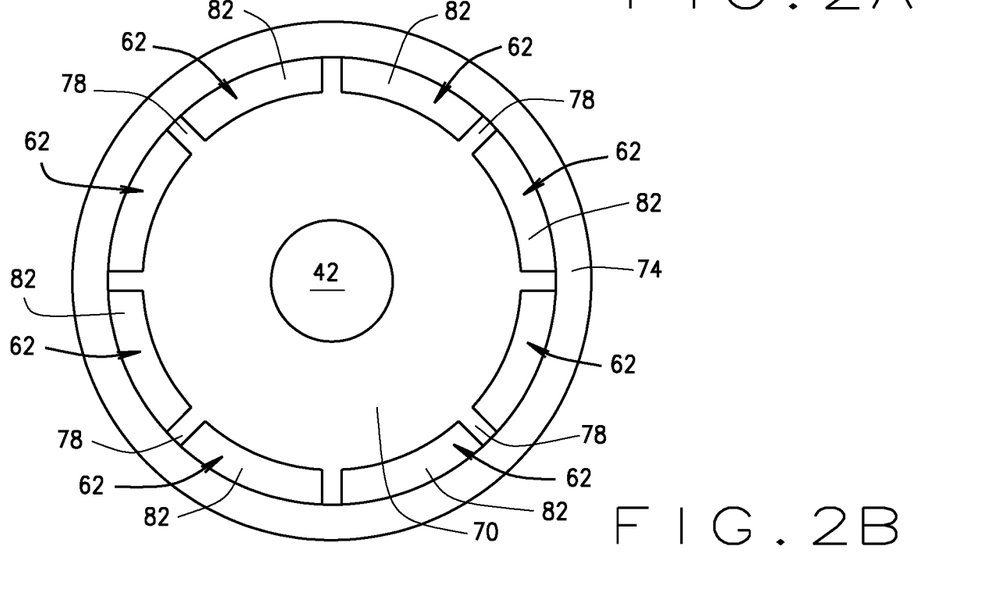
FIG. 2B is a top view of the heat exchanging liquid container system shown in FIG. 2A, in accordance with various embodiments of the present disclosure.

Referring now to FIGS. 1, 2A and 2B, in various embodiments, the PCM module 18 is structured and formed to contact the sidewall(s) 22 of the main body 14, and in various instances the bottom 26 of the main body 14. In such embodiments, the PCM module 18 is a hollow body liner having at least one sidewall 34, and in various instances a bottom 38, that defines the beverage reservoir 42. More particularly, the PCM module 18 is structured and formed to include an interior hollow space that defines the PCM cavity 46 which can be at least partially filled with any desired PCM 50. In various embodiments, only the PCM module sidewall(s) 34 are structured and formed to define the PCM cavity 46, such that only the PCM module sidewall(s) is/are fillable with the PCM 50. While in other embodiments, the PCM module sidewall(s) 34 and bottom 38 are structured and formed to define the PCM cavity 46 and are fillable with the PCM 50. In various embodiments, the main body 14 can be a hollow body structured and formed to include an interior hollow space that defines an insulation cavity 54 that can be at least partially filled with thermal insulation 56. The thermal insulation 56 can be any suitable thermal insulation, for example, in various embodiments the insulation cavity 54 can be at least partially filled with any desired thermal insulating material, gas or liquid, or can be absent a material, gas or liquid. For example, in various instances, the insulation cavity 54 can be absent or void of air, or mostly absent or void of air (e.g., a vacuum or reduced air), or in other instances the insulation cavity 54 can be at least partially filled with fiberglass, polystyrene, polyurethane foam, cellulose, mineral wool, or any other presently and future known thermal insulation material. In such embodiments, the thermal insulating function provided by the thermal insulation 56 within insulation cavity 54 will reduce and retard the rejection of thermal energy (e.g., heat loss) from the PCM 50 to the ambient environment such that the PCM 50 will remain at its respective phase change temperature (also referred to herein as the melting temperature) for an extended period of time, as described below.

In various embodiments, the system 10 can additionally comprise a flow director 58 disposed within the beverage reservoir 42. The flow director 58 is generally a tubular structure (e.g., a cylindrical tube, a square tube, a hexagonal tube, etc.) that extends into the beverage reservoir 42 but does not contact the bottom 38 of the PCM module 18. Additionally, the flow director 58 has a diameter that is smaller than the diameter of the sidewall 34 of the PCM module 18 such that the temperature conditioning channel 62 is formed therebetween. As will be readily understood by one skilled in the art, when the system 10 is tilted to dispense the beverage a beverage flow F will flow from within the reservoir 42, through the channel 62, and exit the conditioning channel 62 at an egress end 62A.

In operation, when the system 10 is tilted to dispense the beverage a flow F through the conditioning channel 62 is generated. Accordingly, the beverage flow F will flow from within the reservoir 42, through the conditioning channel 62 thermally contacting the PCM 50, and exit the conditioning channel 62 at an egress end 62A. As one skilled in the art will readily understand, when the beverage flows through the conditioning channel 62 the beverage thermally contacts the PCM 50 within the PCM module 18. More particularly, when the beverage is at a temperature that is greater than the melting point of the PCM 50, as the beverage flows through the conditioning channel 62 thermal energy is transferred from the beverage to the PCM 50 (i.e., the PCM 50 absorbs thermal energy (heat) from the beverage), thereby cooling the beverage to a temperature within the desired temperature range. The PCM 50 stores the absorbed thermal energy. Conversely, when the beverage is at a temperature that is lower than the melting point of the PCM 50, as the beverage flows through the conditioning channel 62 thermal energy stored in the PCM 50 is transferred from the PCM 50 to the beverage (i.e., the PCM 50 rejects the stored thermal energy (heat) and the beverage absorbs the stored thermal energy (heat) from the PCM 50), thereby heating the beverage to a temperature within the desired temperature range. In this way, when the beverage exits the conditioning channel 62, the beverage will have a temperature within the desired drinking temperature range (e.g., approximately 98° F. to 160° F., 37° C. to 71° C. for hot liquids, and 32° F. to 50° F., 0° C. to 10° C. for cold liquids).

As one skilled in the art will readily understand, due to the volume of the beverage within the reservoir 42 (which includes the conditioning channels 62) when the system 10 is in an upright orientation (i.e., the beverage is not being dispensed and not flowing through the conditioning channel 62) the thermal energy exchange rate between the beverage and the PCM 50 (e.g., the rate of absorption of heat by the PMC 50) will be slower than the thermal energy exchange rate between the beverage flowing through the conditioning channel 62 and the PCM 50 when the beverage is being dispensed. More specifically, when the system 10 is tilted to dispense the beverage, the beverage will begin to flow through the conditioning channel 62 flowing along the sidewall 34 of the PCM module 18 and thermally contacting the PCM 50 within the PCM module 18. However, as described above, the width W of the conditioning channel 62 will regulate the volume and flow rate of beverage allowed to be dispensed, and additionally regulate the rate of thermal energy exchange between the beverage and the PCM 50. As one skilled in the art will readily understand, the smaller the volume of beverage in thermal contact with the PCM 50 the higher the rate of thermal energy exchange, and more specifically, the faster the temperature of beverage will be conditioned, or adjusted, to approximate the melting temperature of the PCM 50, Hence, the temperature of the beverage flowing through the conditioning channel 62 as it is being dispensed will be conditioned, or adjusted, to within the desired drinking temperature range much faster than when the beverage is static within the reservoir 42 and not being dispensed. (i.e., not flowing through the conditioning channel 62).

For example, in various instances, when the beverage is static within the reservoir 42 and not being dispensed, the volume of beverage actively exchanging thermal energy with the PCM (i.e., the total volume of beverage within the reservoir 42) can be V and the thermal exchange rate between the beverage and the PCM 50 can be P. However, when the beverage is being dispensed and flowing through the conditioning channel 62, the volume of the beverage within the conditioning channel 62 can be V/m (wherein, m can be 2, 3, 4, 5, 6, 7, 8 etc.), based on length L and the width W of the conditioning channel 62, and the thermal exchange rate between the beverage flowing through the conditioning channel can be P×n ((i.e., P multiplied by n) wherein n can be 2, 3, 4, 5, 6, 7, 8 etc.). Hence, the conditioning channel 62 enhances the rate of thermal exchange between the beverage and the PCM 50 such that the beverage can be dispensed from the system 10 and consumed at a temperature within the desired temperature range (e.g., at or near the PCM melting temperature) substantially immediately after the beverage is disposed within the reservoir 42.

In various embodiments, the lid assembly 66 comprises a center plate 70 connected to a lip 74 via a plurality of spokes 78 that define a plurality of beverage egress openings 82 therebetween. In such embodiments, the flow director 58 can be connected to a center plate 70. The egress opening 82 extend through the center plate 70 such that the beverage within the beverage reservoir 42 can be dispensed though the egress openings 82 for consumption by a user. As one skilled in the art would readily recognize, when the system 10 is tilted to dispense the beverage via the conditioning channel 62 the beverage will be dispensed through only certain ones of the egress openings 82, and the remaining egress openings will serve as air hole(s) that allow air to be drawn into the beverage reservoir 42 as the beverage is dispensed, thereby providing a smooth flow of the beverage through the respective egress opening(s) 82.

In various other embodiments, the flow director 58 can be mounted (fixedly or removably) within the beverage reservoir 42 via any suitable manner and means for mounting (fixedly or removably) the flow director 58 within the beverage reservoir 42. In various embodiments, the lid assembly 66 additionally includes a connection or retention collar 86 that extends from a bottom side of the center plate 70 and is structured and operable to removably engage with the container body 14 and/or the PCM module 18 in a substantially liquid-tight manner. For example, in various embodiments, the retention collar 86 can threadably and positively engage the body 14 and/or the PCM module 18. Or, in other embodiments, the lid assembly 66 can comprise a seal or gasket, e.g., a rubber-like O-ring or any other type of liquid seal (not shown) disposed around or connected to an inner or outer face of the retention collar 86 such that the seal, and hence the retention collar 86, is removably frictionally and/or compressively engageable with the body 14 and/or the PCM module 18. Although the retention collar 86 is exemplarily shown as removably engageable with the interior surface of body 14 and/or a top surface of the PCM module 18, it is envisioned that the retention collar 86 can be removably engageable with the interior surface of only the body 14, or removably engageable with the interior surface of only the PCM module 18, or removably engageable with the exterior surface of the body 14, or removably engageable with any combination thereof.

Figure 3A:
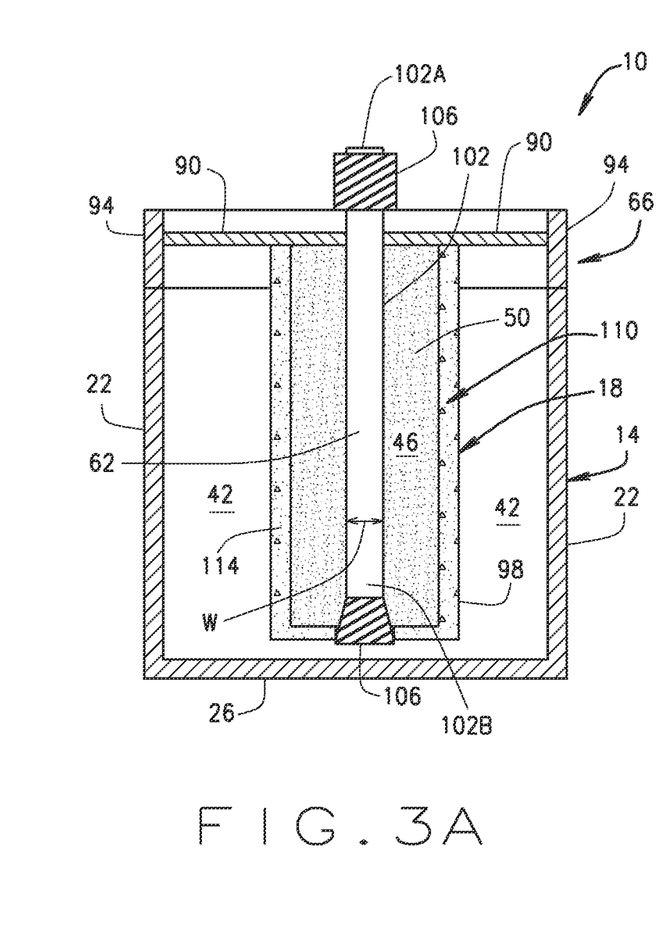
FIG. 3A is cross-sectional view of the heat exchanging container shown in FIG. 1 having a tubular temperature conditioning channel and a dispensing control shown in a Closed position, in accordance with various embodiments of the present disclosure.
Figure 3B:
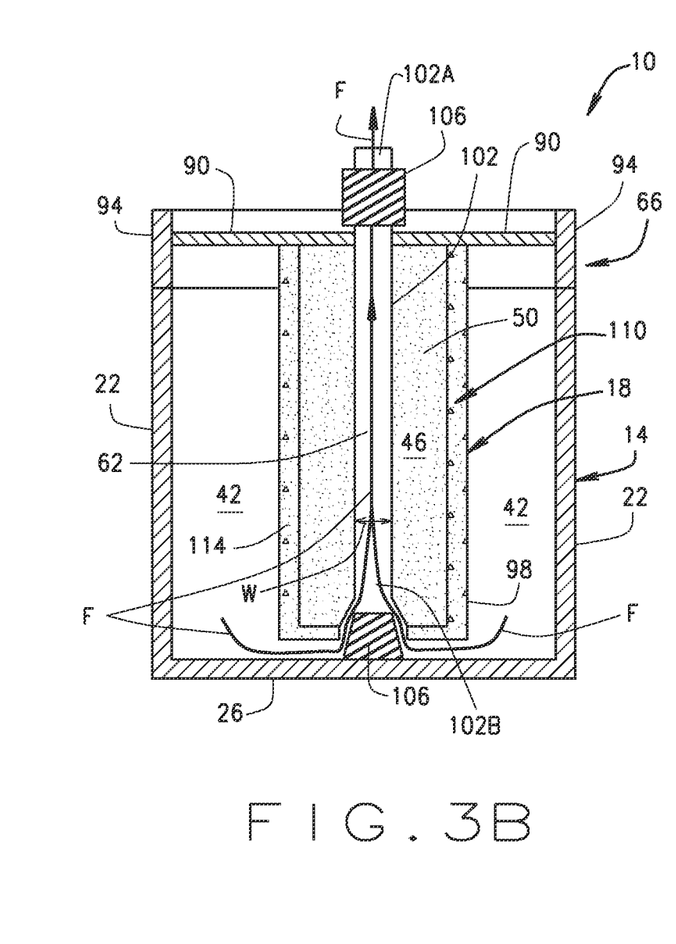
FIG. 3B is a cross-sectional view of the heat exchanging container shown in FIG. 3A wherein the dispensing control is shown in an Open position, in accordance with various embodiments of the present disclosure.

Referring now to FIGS. 1, 3A and 3B, in various embodiments, the lid assembly 66 can comprise a center cover 90 that is integrally formed with a circumferential rim 94, and the PCM module 18 is connected to an underside of the center cover 90 and is suspended into the main body 14, whereby the beverage reservoir 42 is formed around and below the PCM module 18 between an outer surface of the PCM module 18 and an inner surface of the main body 14. The PCM module 18 can be fixedly connected to the center cover 90, or removably connected (e.g., threadingly connected) to the center cover 90. In such embodiments the PCM module 18 comprises a hollow outer body 98 connected to the underside of the lid center cover 90 such that the PCM cavity 46 is defined by the outer body 98 and the underside of the lid center cover 90. The PCM cavity 46 is at least partially filled with a PCM 50 having a selected/desired melting temperature.

In such embodiments, the PCM module 18 additionally comprises a tubular beverage conduit 102 extending through the PCM module 18 (e.g., extending through the PCM module outer body 98) and the lid center cover 90 such that the beverage conduit 102 is in thermal contact with the PCM 50. Moreover, the beverage conduit 102 is hollow such that the temperature conditioning channel 62 is defined therethrough, which is in thermal contact with the PCM 50. Additionally, in such embodiments, the system 10 comprises a user operable beverage flow controller 106 that is structured and operable to allow a user to control the flow of beverage through the conduit 102, and hence through the conditioning channel 62 as the beverage is dispensed from the beverage reservoir 42. The flow controller 106 is shown in a Closed position in FIG. 3A and in an Open position in FIG. 3B. The flow controller 106 can be any system, mechanism or device structured and operable to prevent the flow of the beverage through the conditioning channel 62 (e.g., through the beverage conduit 102) when in the Closed position and to allow the flow of the beverage through the conditioning channel 62 (e.g., through the beverage conduit 102) when in the Open position. Additionally, the flow controller 106 can be any system, mechanism or device structured and operable to provide thermal insulation between the PCM 50 and the beverage within the reservoir 42 when in the Closed position to thereby prevent heat and/or cooling loss of the PCM 50 when the flow controller 106 is in the Closed position.

In various instances of such embodiments, the PCM module outer body 98 can comprises a hollow body structured and formed to include an interior hollow space that defines an insulation cavity 110 that can be at least partially filled with insulation 114. The insulation 114 can be any suitable insulation, for example, in various embodiments the insulation cavity 110 can be at least partially filled with any desired insulating material, gas or liquid, or can be absent a material, gas or liquid. For example, in various instances, the insulation cavity 110 can be absent or void of air or mostly absent or void of air (e.g., a vacuum or reduced air), or in other instances the insulation cavity 110 can be at least partially filled with fiberglass, polystyrene, polyurethane foam, cellulose, mineral wool, or any other presently and future known insulation material. In such embodiments, the insulating function provided by the insulation 114 within insulation cavity 110 will reduce and retard the rejection of thermal energy (e.g., heat loss) from the PCM 50 to beverage disposed within the beverage reservoir 42 such that the PCM will remain at its respective phase change temperature for an extended period of time.

In operation, the beverage conduit 102 functions as a straw whereby a user can extract/draw the beverage from the beverage reservoir 42, via the beverage conduit 102, when the flow controller 106 is in the Open position. As will be readily understood by one skilled in the art, when the flow controller 106 is placed in the Open position, a user can draw the beverage from the beverage reservoir 42 by generating a suction at an egress end 102A of the beverage conduit 102, thereby generating a flow F through the conditioning channel 62 (e.g., though the beverage conduit 102) from an ingress end 102B of the beverage conduit 102 to the egress end 102A. Accordingly, the beverage flow F will flow from within the reservoir 42, through the conditioning channel 62 thermally contacting the PCM 50, and exit the conditioning channel 62 at an egress end 102A. As one skilled in the art will readily understand, when suction is generated at the egress end 102A of the beverage conduit 102 the beverage will begin to flow through the conditioning channel 62 thermally contacting the PCM 50 within the PCM module 18. More particularly, when the beverage is at a temperature that is greater than the melting point of the PCM 50, as the beverage flows through the conditioning channel/beverage conduit 62/102 thermal energy is transferred from the beverage to the PCM 50 (i.e., the PCM 50 absorbs thermal energy (heat) from the beverage), thereby cooling the beverage to a temperature within the desired temperature range. The PCM 50 stores the absorbed thermal energy.

Conversely, when the beverage is at a temperature that is lower than the melting point of the PCM 50, as the beverage flows through the conditioning channel/beverage conduit 62/102 thermal energy stored in the PCM 50 is transferred from the PCM 50 to the beverage (i.e., the PCM 50 rejects the stored thermal energy (heat) and the beverage absorbs the stored thermal energy (heat) from the PCM 50), thereby heating the beverage to a temperature within the desired temperature range. In this way, when the beverage exits conditioning channel/beverage conduit 62/102, the beverage will have a temperature within the desired drinking temperature range (e.g., approximately 98° F. to 160° F., 37° C. to 71° C. for hot liquids, and 32° F. to 50° F., 0° C. to 10° C. for cold liquids).

As described above, the temperature conditioning channel 62 has a width W that is selected to regulate the volume and flow rate of beverage allowed to be dispensed, and additionally regulate the rate of thermal energy exchange between the beverage and the PCM 50. As one skilled in the art will readily understand, the smaller the volume of beverage in thermal contact with the PCM 50 (i.e., the small the width W of the conditioning channel 62) the higher the rate of thermal energy exchange between the beverage and the PCM 50, and more specifically, the faster the temperature of beverage will be conditioned, or adjusted, to approximate the melting temperature of the PCM 50.

In instances where the system 10 is utilized to provide beverages at a cooled/cold temperature (e.g., soda, water, tea, sports drinks, beer, etc.) the PCM 50 will be selected to have a low melting temperature such as 32° F. to 50° F., 0° C. to 10° C. In such instances, the PCM module 18 can be placed in an environment having a temperature at or below the respective melting temperature of the PCM 50 (e.g., in a refrigerated freezer) such that the PCM 50 obtains a temperature at or below the respective melting temperature. Thereafter, when it is desired to utilize the system 10 to provide a cooled/cold beverage, the beverage can be deposited into the beverage reservoir 42 at any temperature (e.g., room temperature, approx. 70° F./21° C.) and the PCM module 18 can be placed into the beverage reservoir 42 and secured in place via the lid 66. Alternatively, in various instances, the PCM module 18 can be placed into the beverage reservoir 42 and secured in place via the lid 66, whereafter the beverage can be deposited into the beverage reservoir 42 at any temperature (e.g., room temperature, approx. 70° F./21° C.). Substantially, immediately thereafter the beverage can be drawn through the conditioning channel/beverage conduit 62/102, as described above, whereby the beverage having a temperature above the melting temperature of the PCM 50 (e.g., room temperature) is quickly cooled to, and dispensed at, a temperature within the desired temperature range. Moreover, due to the insulation 114 within the insulation cavity 110 of the PCM module outer body 98, the temperature of the beverage within the beverage reservoir 42 will remain substantially at the temperature at which it was deposited into the beverage reservoir 42 (e.g., room temperature), and will not exchange thermal energy with the PCM 50 until the beverage is drawn through the conditioning channel/beverage conduit 62/102, as described above.

Figure 4A:
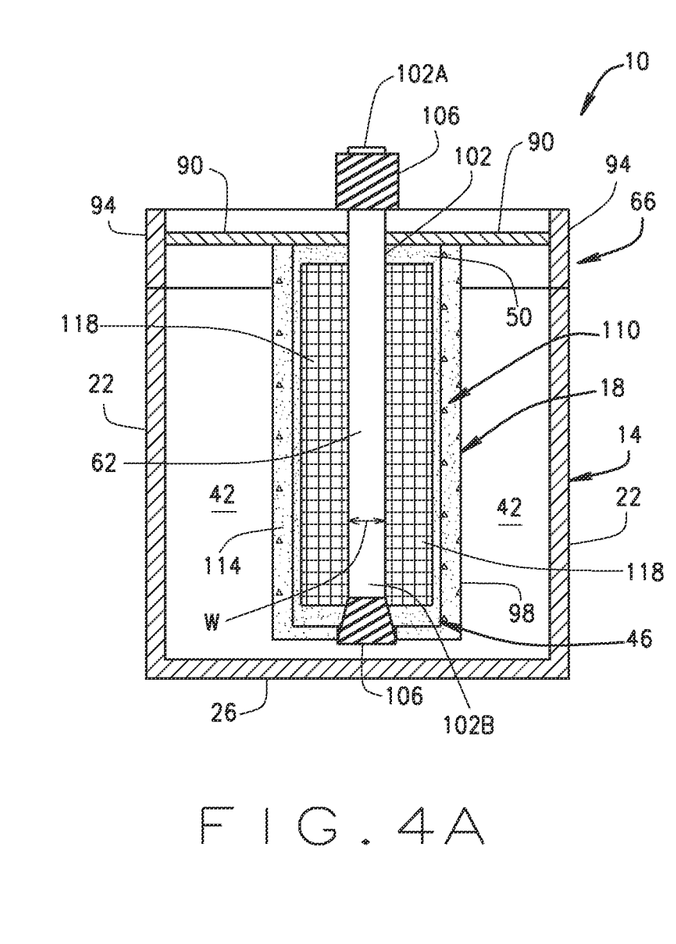
FIG. 4A is cross-sectional view of the heat exchanging container shown in FIGS. 3A and 3B further comprising one or more heat sink disposed within a PCM module, wherein the temperature conditioning channel is in the Closed position, in accordance with various embodiments of the present disclosure.
Figure 4B:
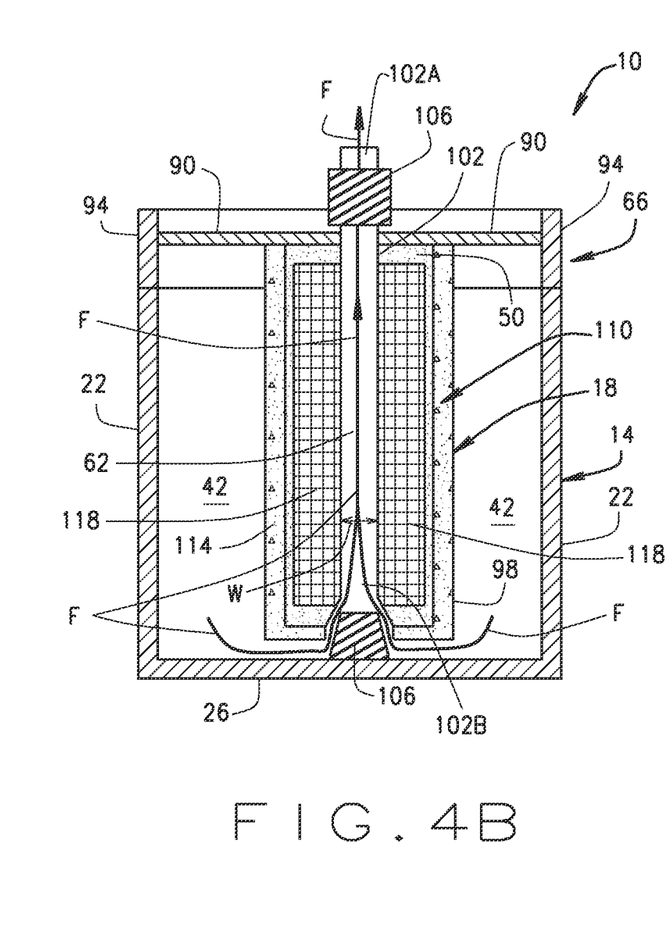
FIG. 4B is a cross-sectional view of the heat exchanging container shown in FIG. 4A wherein the dispensing control is shown in an Open position, in accordance with various embodiments of the present disclosure.

Referring now to FIGS. 1, 4A and 4B, in various embodiments, the container system 10 described above with regard to FIGS. 1, 3A and 3B can further comprise one or more heat sink 118 disposed within the PCM cavity 46. More particularly, the heat sink(s) 118 is/are disposed within the PCM cavity 46 and physically connected to, or in physical contact with, the beverage conduit 102 (and hence the conditioning channel 62), and therefore is/are also in thermal contact with the beverage conduit 102 (and hence the conditioning channel 62). Furthermore, the heat sink(s) 118 is/are in physical and thermal contact with the PCM 50 disposed within the PCM cavity 46. As one skilled in the art will readily understand, due to the physical and/or thermal connection or contact of the heat sink(s) 118 to/with the conditioning channel/beverage conduit 62/102, and with the PCM 50, the heat sink(s) 118 function to increase the rate of thermal exchange between the beverage flow F flowing through the conditioning channel/beverage conduit 62/102 and the PCM 50. More specifically, as one skilled in the art will readily understand, as the beverage flows through the conditioning channel/beverage conduit 62/102 the outer wall of the beverage conduit 102 prevents the beverage from physically contacting the PCM 50. Therefore, the thermal exchange between the beverage flowing through the condition channel 62 occurs via, or through, the outer wall of the beverage conduit 102. That is, thermal energy from the beverage is extracted by, or transmitted to, the beverage conduit outer wall, whereafter the thermal energy is extracted by, or transmitted to the PCM 50, and vice-versa. Therefore, since the heat sink(s) 118 are physically and thermally connected to or in contact to/with the conditioning channel/beverage conduit 62/102, and with the PCM 50, thermal energy from the beverage is extracted by, or transmitted to, the beverage conduit outer wall and the heat sink(s) 118, whereafter the thermal energy is extracted by, or transmitted to the PCM 50, and vice-versa. Hence, as one skilled in the art will readily understand, the heat sink(s) 118 will increase the thermal exchange rate between the beverage and the PCM 50, and therefore, increase the rate at which the temperature of the beverage flow F flowing through the conditioning channel/beverage conduit 62/102 is conditioned or adjusted to be within the desire temperature range.

Figure 5A:
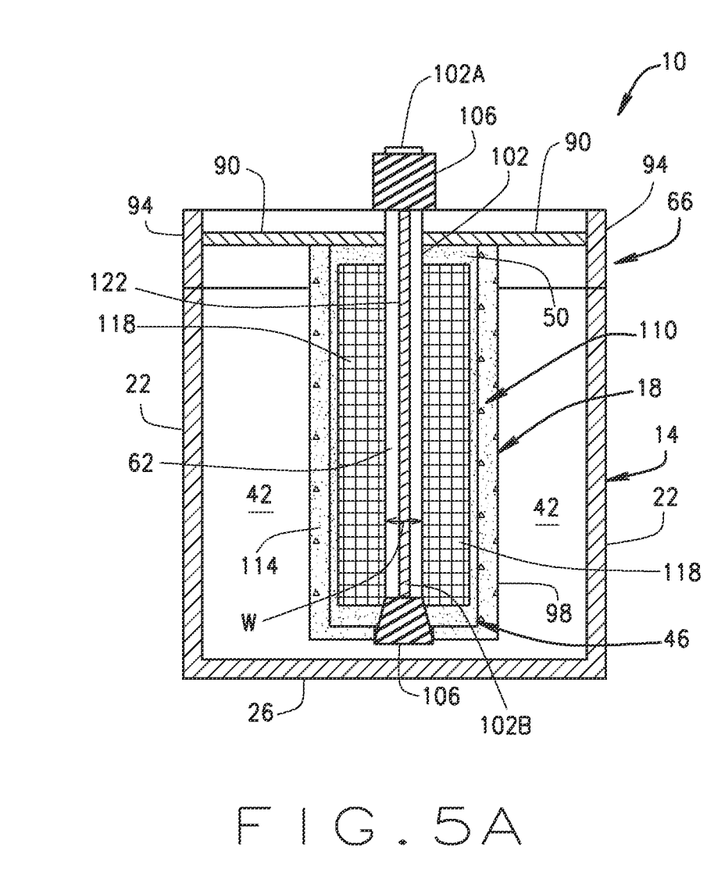
FIG. 5A is cross-sectional view of the heat exchanging container shown in FIGS. 4A and 4B further comprising a conditioning channel center rod, wherein the temperature conditioning channel is in the Closed position, in accordance with various embodiments of the present disclosure.
Figure 5B:
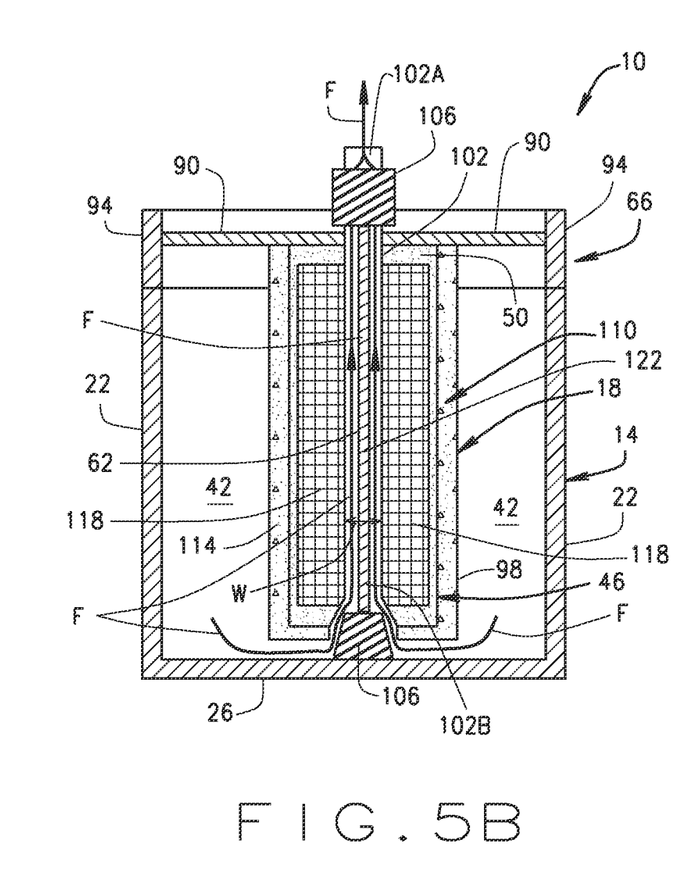
FIG. 5B is a cross-sectional view of the heat exchanging container shown in FIG. 5A wherein the dispensing control is shown in an Open position, in accordance with various embodiments of the present disclosure.

Referring now to FIGS. 1, 5A and 5B in various embodiments, the container system 10 described above with regard to any one or more of FIGS. 1, 3A, 3B, 4A and/or 4B can further comprise a center rod 122 disposed within the conditioning channel/beverage conduit 62/102. The center rod 122 can have any length that is shorter than or equal to the length of the beverage conduit 102, for example, the center rod can have a length that is approximately as long as a length of the PCM cavity 46. Generally, the center rod 122 is structured and operable to consume space within at least the portion of the beverage conduit that extends through the PCM cavity 46, such that the size of the conditioning channel 62 is reduced, thereby reducing the volume of the beverage flow F flowing through the conditioning channel/beverage conduit 62/102. As described above, and as one skilled in the art will readily understand, reducing the volume of the beverage flow F flowing through the conditioning channel/beverage conduit 62/102 will increase the rate of thermal exchange between the beverage and the PCM 50, and hence, the rate at which the temperature of the beverage flow F flowing through the conditioning channel/beverage conduit 62/102 is conditioned or adjusted to be within the desire temperature range. Therefore, the beverage can be dispensed and consumed at a temperature within the respective desired beverage temperature range substantially immediately after the beverage is disposed within the beverage reservoir 42. It is envisioned that in various embodiments, the center rod 122 can be a heat transfer capacitor, a heat pipe, or a heat transfer device structured and operable to increase the rate of thermal exchange between the beverage and the PCM 50, and hence, the rate at which the temperature of the beverage flow F flowing through the conditioning channel/beverage conduit 62/102 is conditioned or adjusted to be within the desire temperature range.

Figure 6A:
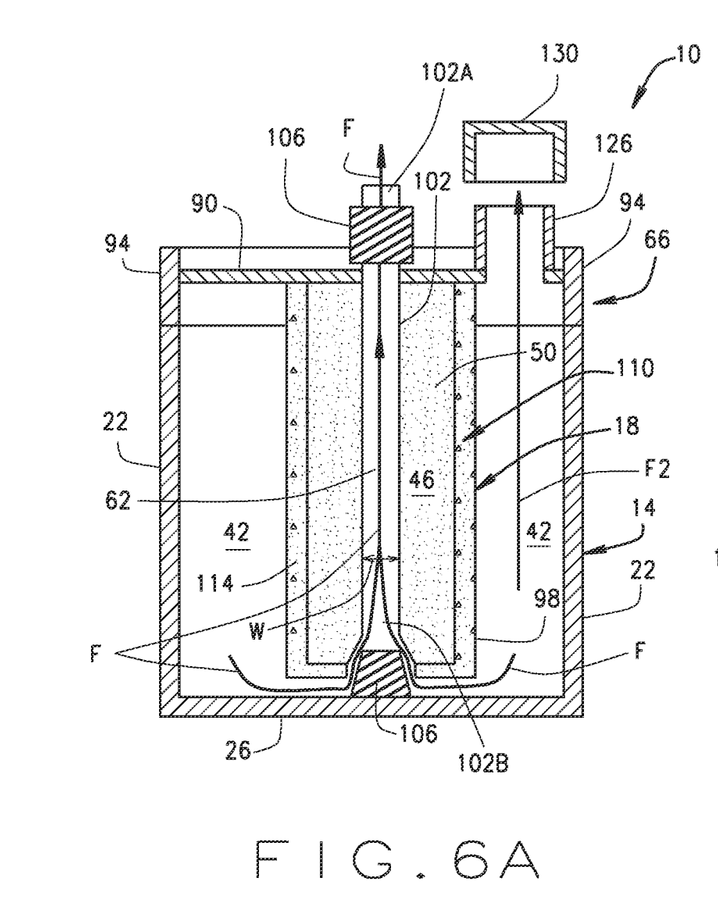
FIG. 6A is cross-sectional view of the heat exchanging container shown in FIG. 3B further comprising a beverage reservoir direct flow outlet, in accordance with various embodiments of the present disclosure.
Figure 6B:
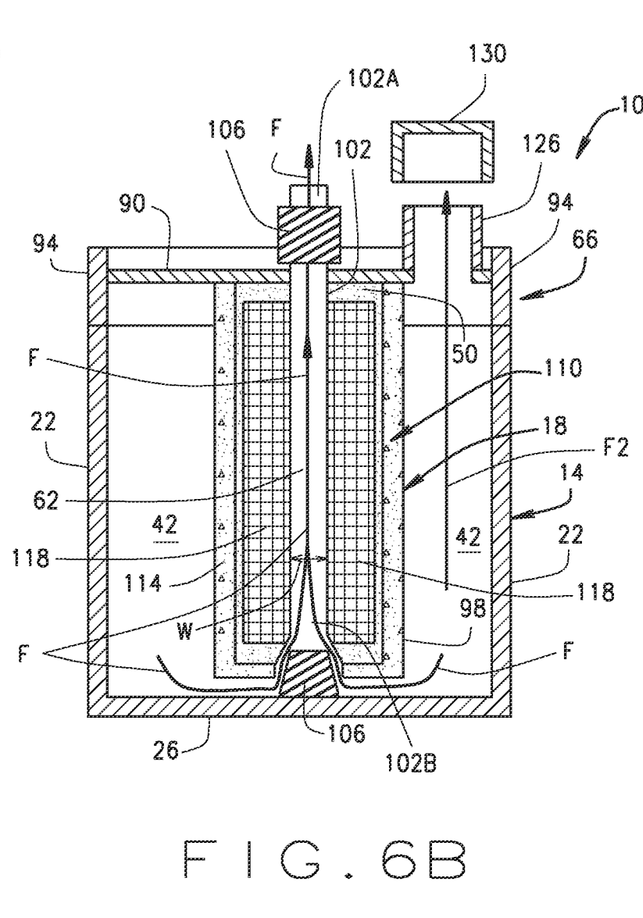
FIG. 6B is cross-sectional view of the heat exchanging container shown in FIG. 4B further comprising the beverage reservoir direct flow outlet, in accordance with various embodiments of the present disclosure.
Figure 6C:
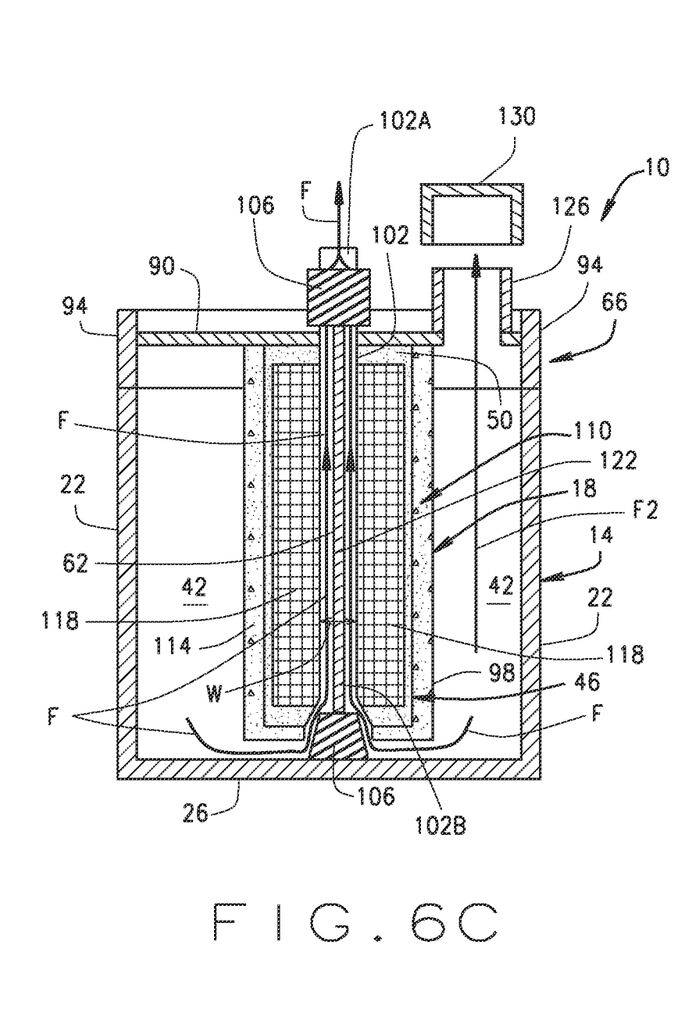
FIG. 6C is cross-sectional view of the heat exchanging container shown in FIG. 5B further comprising the beverage reservoir direct flow outlet, in accordance with various embodiments of the present disclosure.

Referring now to FIGS. 1, 6A, 6B and 6C in various embodiments, the container system 10 described above with regard to any one or more of FIGS. 1, 3A, 3B, 4A, 4B, 5A and/or 5B can further comprise a beverage reservoir direct flow outlet 126. The direct flow outlet 126 is fluidly connected to the beverage reservoir 42 such that the beverage can be disposed into the beverage reservoir 42 therethrough, and subsequently, the beverage disposed therein can be dispensed without flowing though the conditioning channel/ beverage conduit 62/102. Particularly, the direct flow outlet 126 is structured and operable provide a flow path for a flow F2 of the beverage for dispensing the beverage disposed within liquid reservoir 42 without flowing through the temperature conditioning channel 62 such that the liquid can be dispensed at the temperature at which the beverage has within the beverage reservoir 42. More particularly, when it is desired to dispense the beverage from the beverage reservoir without conditioning (adjusting) the temperature of the beverage via the conditioning channel/beverage conduit 62/102, as described above, the system 10 can be tilted such that the flow F2 of the beverage is generated and is dispensed from the beverage reservoir 42 via the direct flow outlet 126.

Hence, in such embodiments, the system 10 can provide a two temperature beverage dispensing system, whereby the beverage can be selectably dispensed via the direct flow outlet 126 at a temperature of the beverage within the reservoir 42 (e.g., an unconditioned temperature), or via the conditioning channel/beverage conduit 62/102 at a temperature within the desired temperature range (as dictated by the melting temperature of the respective PCM 50). For example, if the beverage disposed within the beverage reservoir 42 has a temperature of approximately 72° F./21° C., and the PCM 50 within the PCM module 18 is selected to have a melting temperature of 32° F./0° C., thereby providing a desired temperature range of 32° F./0° C. to 41° F./5° C., the system 10 can be tilted to dispense the beverage via the direct flow outlet 126 at a temperature of 72° F./21° C., and also the beverage can be drawn from the beverage reservoir 42 and though the conditioning channel/beverage conduit 62/102, whereby the 72° F./21° C. beverage is conditioned as described above and dispensed from beverage conduit 102 at a temperature between 32° F./0° C. and 41° F./5° C. In various embodiments, the system 10 can further comprise a direct flow outlet lid or cap 130 that is removably connectable to the direct flow outlet 126 to control the beverage flow F2 from the direct flow outlet 126 (e.g., to open and close the direct flow outlet 126).

In various embodiments, all or any of the systems and components of the heat exchanging liquid container system 10 described herein can be combined with one or more of the systems and components of a thermal liquid container system described in U.S. patent application Ser. No. 15/803,977, titled Heat Exchanging Thermal Liquid Container, filed Nov. 6, 2017, the disclosure of which is incorporated herein by reference in its entirety.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A heat exchanging liquid container system for consistently dispensing a liquid from the system at a temperature within a desired temperature range, said system comprising:
    a main body;
    a phase change material (PCM) module disposable within the main body;
    a PCM disposed within the PCM module, the PCM having a selected melting temperature;
    a liquid reservoir formed one of within the PCM module and surrounding the PCM module, the liquid reservoir structured and operable to have liquid disposed therein having a first temperature; and
    a temperature conditioning channel formed at least one of along a wall of the PCM module and through the PCM module such that the temperature conditioning channel is in thermal contact with the PCM within the PCM module, wherein the temperature conditioning channel is structured and operable to provide a flow path through which the liquid can flow to dispense the liquid from the liquid reservoir such that the liquid will be in thermal contact with the PCM while being dispensed, the PCM structured and operable to, via the thermal contact with the liquid as the liquid is dispensed though the temperature conditioning channel, exchange thermal energy with the liquid and thereby condition the liquid to be dispensed at a second temperature that is within a desired temperature range determined by the selected PCM melting temperature.

2. The system of claim 1 further comprising a flow director disposed within the liquid reservoir, the flow director structured and operable to form the temperature conditioning channel between the flow director and a wall of the PCM module.

3. The system of claim 1 further comprising:
    a lid assembly that is removably engageable with the main body and the PCM module is connectable to an underside of a center cover of the lid such that the PCM module is suspended into the main body, thereby defining the liquid reservoir around and below the PCM module, and the PCM module comprises a tubular liquid conduit extending through the PCM module and the lid center cover, wherein the liquid conduit defines temperature conditioning channel; and
    a liquid flow controller structured and operable to control the flow of liquid through the temperature conditioning channel.

4. The system of claim 3 further comprising at least one heat sink disposed within the PCM module and physically connected to the liquid conduit, the at least one heat sink structured and operable to increase a rate of the thermal energy exchange between the PCM and the liquid as the liquid flows through the temperature conditioning channel when being dispensed from the liquid reservoir.

5. The system of claim 3 further comprising a center rod disposed within the temperature conditioning channel, the center rod structured and operable to increase a rate of the thermal energy exchange between the PCM and the liquid as the liquid flows through the temperature conditioning channel when being dispensed from the liquid reservoir.

6. The system of claim 4 further comprising a center rod disposed within the temperature conditioning channel, the center rod structured and operable to increase a rate of the thermal energy exchange between the PCM and the liquid as the liquid flows through the temperature conditioning channel when being dispensed from the liquid reservoir.

7. The system of claim 3 further comprising a liquid reservoir direct flow outlet structured and operable have liquid disposed within liquid reservoir dispensed therethrough without flowing through the temperature conditioning channel such that the liquid is dispensed at the first temperature.

8. The system of claim 4 further comprising a liquid reservoir direct flow outlet structured and operable have liquid disposed within liquid reservoir dispensed therethrough without flowing through the temperature conditioning channel such that the liquid is dispensed at the first temperature.

9. The system of claim 6 further comprising a liquid reservoir direct flow outlet structured and operable have liquid disposed within liquid reservoir dispensed therethrough without flowing through the temperature conditioning channel such that the liquid is dispensed at the first temperature.

10. A heat exchanging liquid container system for consistently dispensing a liquid from the system at a temperature within a desired temperature range, said system comprising:
a main body;
a phase change material (PCM) module disposable within the main body;
a PCM disposed within the PCM module, the PCM having a selected melting temperature;
a liquid reservoir formed one of within the PCM module and surrounding the PCM module, the liquid reservoir structured and operable to have liquid disposed therein having a first temperature;
a flow director disposed within the liquid reservoir, the flow director having a diameter that is smaller than a diameter of a sidewall PCM module, and
a temperature conditioning channel formed between flow director and the sidewall of the PCM module such that the temperature conditioning channel is in thermal contact with the PCM within the PCM module, wherein the temperature conditioning channel is structured and operable to provide a flow path through which the liquid will flow when being dispensed from the liquid reservoir such that the liquid will be in thermal contact with the PCM while being dispensed, the PCM structured and operable to, via the thermal contact with the liquid as the liquid is dispensed though the temperature conditioning channel, exchange thermal energy with the liquid and thereby condition the liquid to be dispensed at a second temperature that is within a desired temperature range determined by the selected PCM melting temperature.

11. A heat exchanging liquid container system for consistently dispensing a liquid from the system at a temperature within a desired temperature range, said system comprising:
a main body;
a lid assembly removably engageable with the main body, the lid comprising a center cover integrally formed with a circumferential rim;
a phase change material (PCM) module connectable to an underside of the center cover of the lid such that the PCM module is suspended into the main body when the lid is engaged with the main body;
a PCM disposed within the PCM module, the PCM having a selected melting temperature;
a liquid reservoir defined around and below the PCM module, between the PCM module and the main body, when the lid is engaged with the main body and the PCM module is suspended into the main body, the liquid reservoir structured and operable to have liquid disposed therein having a first temperature;
a tubular liquid conduit extending through the PCM module and the lid center cover,
wherein the liquid conduit defines a temperature conditioning channel formed through the PCM module such that the temperature conditioning channel is in thermal contact with the PCM within the PCM module, wherein the temperature conditioning channel is structured and operable to provide a flow path through which the liquid can flow to dispense the liquid from the liquid reservoir such that the liquid will be in thermal contact with the PCM while being dispensed, the PCM structured and operable to, via the thermal contact with the liquid as the liquid is dispensed though the temperature conditioning channel, exchange thermal energy with the liquid and thereby condition the liquid to be dispensed at a second temperature that is within a desired temperature range determined by the selected PCM melting temperature;
a liquid flow controller structured and operable to control the flow of liquid through the temperature conditioning channel; and
a liquid reservoir direct flow outlet structured and operable provide a flow path for dispensing liquid disposed within liquid reservoir without the liquid flowing through the temperature conditioning channel such that the liquid can be dispensed at the first temperature.

12. The system of claim 11 further comprising at least one heat sink disposed within the PCM module and physically connected to the liquid conduit, the at least one heat sink structured and operable to increase a rate of the thermal energy exchange between the PCM and the liquid as the liquid flows through the temperature conditioning channel when being dispensed from the liquid reservoir.

13. The system of claim 12 further comprising a center rod disposed within the temperature conditioning channel, the center rod structured and operable to increase a rate of the thermal energy exchange between the PCM and the liquid as the liquid flows through the temperature conditioning channel when being dispensed from the liquid reservoir.

14. The system of claim 11 further comprising a center rod disposed within the temperature conditioning channel, the center rod structured and operable to increase a rate of the thermal energy exchange between the PCM and the liquid as the liquid flows through the temperature conditioning channel when being dispensed from the liquid reservoir.

* * * * *